United States Patent [19]

Hütter

[11] Patent Number: 4,792,871
[45] Date of Patent: Dec. 20, 1988

[54] CASSETTE LOADING APPARATUS WITH DIFFERENTIAL GEAR PROVIDING THREE FUNCTIONS

[75] Inventor: Heinrich Hütter, Tulln, Austria

[73] Assignee: U.S. Philips Corporation, New York, N.Y.

[21] Appl. No.: 891,000

[22] Filed: Jul. 25, 1986

[30] Foreign Application Priority Data

Aug. 6, 1985 [AT] Austria .................. 2304/85

[51] Int. Cl.⁴ .............................................. G11B 5/027
[52] U.S. Cl. ........................................ 360/85; 360/95
[58] Field of Search ............... 360/88, 85, 95, 90, 360/93, 96.5, 137

[56] References Cited

U.S. PATENT DOCUMENTS

| | | | |
|---|---|---|---|
| 4,491,885 | 1/1985 | Morikawa et al. | 360/85 |
| 4,611,251 | 9/1986 | Yokoo | 360/95 |
| 4,661,864 | 4/1987 | Kuwajima | 360/85 |
| 4,672,476 | 6/1987 | Saito | 360/85 |
| 4,685,009 | 8/1987 | Min et al. | 360/95 |

FOREIGN PATENT DOCUMENTS

| | | | |
|---|---|---|---|
| 0074859 | 5/1982 | Japan | 360/85 |
| 0135472 | 8/1982 | Japan | 360/95 |

Primary Examiner—Stuart N. Hecker
Assistant Examiner—David J. Severin
Attorney, Agent, or Firm—F. Brice Faller

[57] ABSTRACT

In a recording and/or playback unit (1) for a cassette (2) containing a magnetic tape (54), a motor driven differential gear (118) effects displacement of a cassette holder (10), a tape threading device (69), and at least one tape run operating device (58). The cassette holder (10) is movable between a loading position and an operational position to transport a cassette inserted manually into the unit into an operational position. The tape threading device (69) is movable between an unthreaded position and a threaded position for winding the magnetic tape (54) around a scanning device (70). The tape run operating device (58) is movable between at least two operational positions to effect a tape run operation in at least one of its operational positions.

4 Claims, 6 Drawing Sheets

CASSETTE LOADING APPARATUS WITH DIFFERENTIAL GEAR PROVIDING THREE FUNCTIONS

BACKGROUND OF THE INVENTION

The invention relates to a recording and/or playback unit for magnetic tape housed in a cassette and capable of being transported out of it. A cassette holder for holding and displacing a cassette is movable between a loading position, in which the cassette can be inserted into the cassette holder, and an opertional position, in which the cassette occupies an operational position. A tape threading device for drawing the magnetic tape out of the cassette when in its operational position and for wrapping it around a magnetic tape scanning device is movable between an unthreaded position, in which it engages behind the magnetic tape housed in the cassette, and a threaded position, in which it holds the magnetic tape wrapped around the scanning device after it has been transported out of the cassette. At least one tape run operating device carries out at least one tape run function with the cassette in its operational position, and is movable between at least two operational positions. In at least one of its two operational positions it effects the tape run function. A differential gear which can be driven in opposed directions of rotation by a motor has at least two outputs by means of which the tape threading device and the tape run operating device are movable via at least one of its outputs.

Such a unit has been proposed in EP-A-O No. 057921, to which U.S. Pat. No. 4,491,885 corresponds. This prior art unit has a differential gear with two outputs. Via one output the tape threading device of the unit is movable between its unthreaded position and its threaded position. The tape threading device consists essentially of two concentric, superposed rings which can be driven via the one output of the differential gear. The rings enclose a drum-shaped scanning device for the magnetic tape and carry the tape guides by means of which, when the rings are displaced from their unthreaded position to their threaded position, the magnetic tape can be transported out of the cassette and wrapped around the scanning device. Via the other output of the differential gear a displacement component constructed as a slide can be driven. When the tape threading device is in its unthreaded position this displacement component is movable via the other output between a neutral position and an intermediate position, in which the displacement component can be stopped and in which the tape threading device is movable via the one output of the differential gear between its unthreaded position and its threaded position. When the tape threading device is in its threaded position, the displacement component is movable via the other output between its intermediate position and three displacement positions. By displacing the displacement component between its neutral position and its intermediate position a movable unit device can be displaced. This unit device has a multi-arm locking lever movable between a release position and a locking position, and a spring loading the locking lever in the direction of its locking position. In its locking position the locking lever locks the cassette holder by means of a lever arm and operates a switch by means of a different level arm. When the displacement component is displced between its intermediate position and its three displacement positions, several tape run operating devices are movable by means of the displacement component, which tape run operating devices are provided for the purpose of effecting several tape run functions, such as "normal forward", "fast forward", "fast rewind" and "stop" when the cassette is in its operational position.

These tape run operating devices comprise a pinch roller device by means of which, in the "normal forward" tape run function, a pinch roller can be pressed against a tape drive shaft for driving the magnetic tape at a constant rate of travel; a spool disc drive device by means of which, in the "normal forward", "fast forward" and "fast rewind" tape run functions, the spool discs, which can be brought into drive linkage with the spools housed in the cassette and whose purpose is to wind the magnetic tape onto one of the two spools, can be driven; a spool disc braking device by means of which, in the "stop" tape run function, the spool discs can be maintained stationary so as to prevent them from rotating undesirably and which, in the "normal forward", "fast forward" and "fast rewind" tape run functions as well as when the magnetic tape is being threaded and unthreaded by means of the tape threading device, is lifted so as to release the spool discs; a tape tension adjustment device, which has a tape tension sensor which can be brought into operative linkage with the magnetic tape and by means of which tape tension sensor, in the "normal forward" tape run function, the tape tension of the magnetic tape driven by means of the drive shaft can be adjusted. The cassette holder is displaced manually in the prior art unit, whereby to displace the cassette holder from its loading position to its operational position it must be pressed down manually, and to displace it in the reverse direction from its operational position to its loading position a displacement device acting upon the cassette holder is operated by hand.

The prior art unit utilizes the differential gear to displace a series of movable unit devices. A disadvantage of the prior art unit, however, is that the cassette holder, which likewise represents a unit device, has to be displaced manually.

SUMMARY OF THE INVENTION

The object of the invention is to create a unit in which the cassette holder can simply and practically be displced by means of a motor without the addition of any devices to the prior art unit. To this end the differential gear, besides being used to displace the tape threading device and the tape run operating device, also provides the means, via one output, for displacing the cassette holder between its load position and its operational position. Via at least one further output, at least one tape threading device and the tape run operating device can be moded by means of the differential gear. The cassette holder can thus be moved by means of the motor, in which case the differential gear, which is in the unit anyway, is used to displace the cassette holder in addition to transmitting power to it from the motor. In this way a unit is created which has a high degree of operating ease, this being achieved at practically no extra cost.

It has been proposed several times in the past to displace a cassette holder between a load position and an operational position by means of a motor, for example as described in German Patent Specification No. 30 31 690, to which U.S. Pat. No. 4,379,313 corresponds. However, in all earlier cases a separate motor was provided for the purpose of this displacement, driving the cassette holder via a separate gear, which constitutes a considerable expense and requires additional space.

In the unit embodying the invention, the motor and the already present differential gear for displacing the tape threading device and the tape run operating device are further utilized for displacing the cassette holder, so that the cassette holder is displaced using means already present in the unit and hence without any additional expense or extra space requirements.

The differential gear can via one output displace only the cassette holder and via at least one further output displace the tape threading device and the tape run operating device. The differential gear can however, also displace the cassette holder and either one of the threading device or the tape run operating device via one output, whereupon the other one of these two devices is displaced via a different output of the differential gear. In a unit in which the differential gear has two outputs and drives via one output the tape threading device and via the other output a displacement component, it is particularly advantageous if the movable unit device is the cassette holder and the latter is movable between its loading position and its operational position by means of the displacement component moving between its neutral position and its intermediate position. In this way the displacement component, which is present in the unit anyway, is utilized additionally to displace the cassette holder.

It has further been found to be advantageous if the differential gear has three outputs and, in order to displace the cassette holder device and the tape threading device and the tape run operating device, one of these three devices can be displaced via any of the three outputs by means of the differential gear. In this way an additional degree of freedom is achieved with regard to the choice of the spatial location of the unit components to be displaced by the outputs of the differential gear.

DETAILED DESCRIPTION OF THE PREFERRED EMBODIMENT

Figure 1:
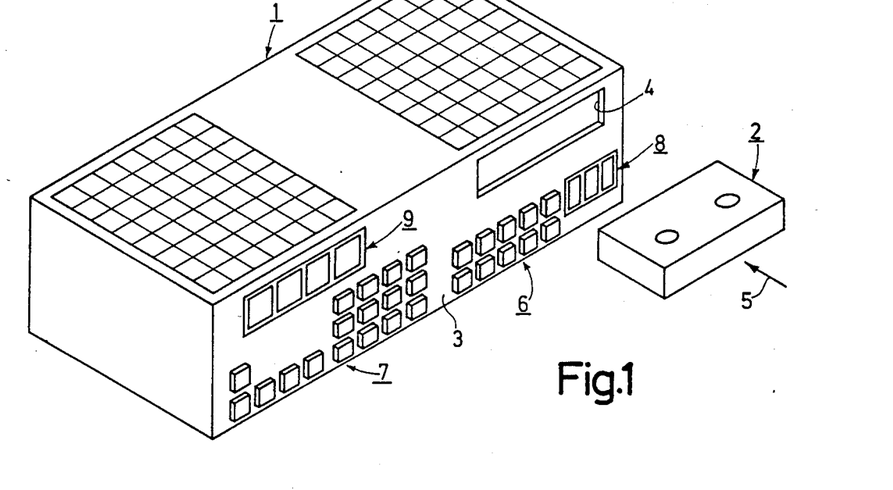
FIG. 1 is a perspective of a first embodiment of a recording and playback unit into which a cassette is inserted through a front panel.

FIG. 1 shows a recording and playback unit 1, which is designed to record and reproduce video and audio signals on a magnetic tape. The magnetic tape is housed in a rectangular cassette 2 containing two adjacent reel hubs, between which the magnetic tape runs, and can be inserted manually into the unit 1 in the direction of the arrow 5 through an opening 4 in the front panel 3 of the unit housing. When the cassette 2 is inserted into the unit it is pushed into a movable cassette holder which transfers the cassette, first parallel to and then perpendicular to the main cassette walls, into an operational position in the unit, schematically shown in FIGS. 4 and 5. For the purpose of starting the functions of the unit, such as "record", "playback at normal speed", "playback at normal reverse speed", playback with stationary tape", "fast forward", "fast rewind", etc., and of starting operational functions, such as "displacing the cassette holder device", "displacing the tape threading device", etc., the unit 1 has a first set 6 of control buttons on the front panel 3. For the purpose of programming the unit and entering further data, for example for setting a clock, the unit 1 has a second set 7 of control buttons on the front panel 3. In addition the unit 1 has two display units 8 and 9 on the front panel 3, each of whose display positions is made up of, say, seven segments and which can be used for indicating counter positions of a counter for the purpose of measuring the tape used and for indicating times. Such a cassette holder has been described in detail in the earlier non-prepublished Austrian patent application No. A 1084/85 to which copending U.S. patent application Ser. No. 849,607 filed Apr, 8, 1986 corresponds, and is therefore described only briefly below.

Figure 2:
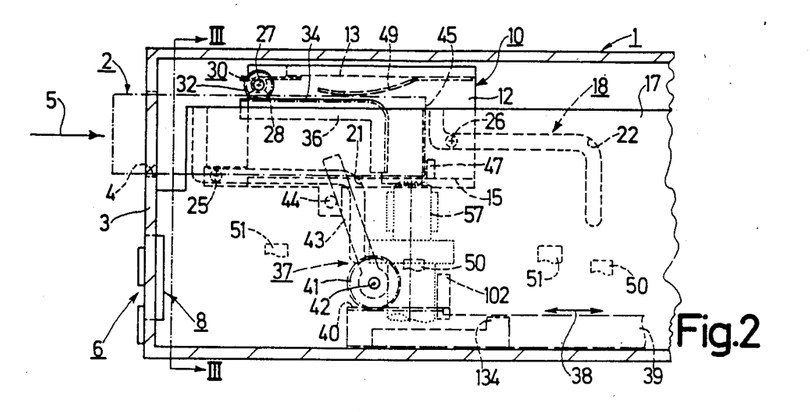
FIG. 2 is a partial side sectional view showing the cassette holder in its loading position.
Figure 3:
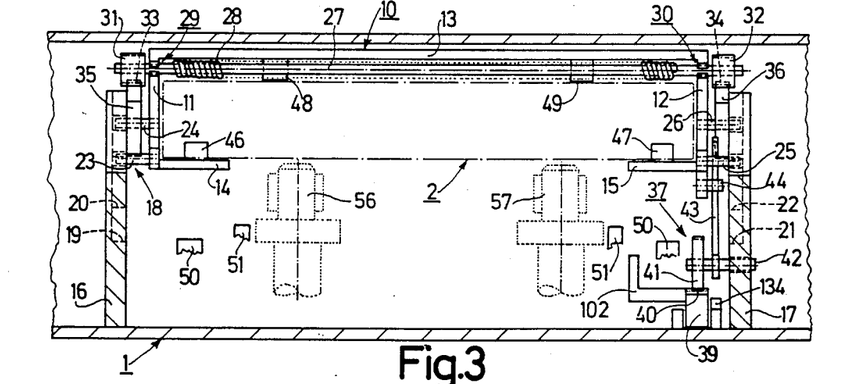
FIG. 3 is a partial front sectional view taken along line III—III of FIG. 2.
Figure 4:
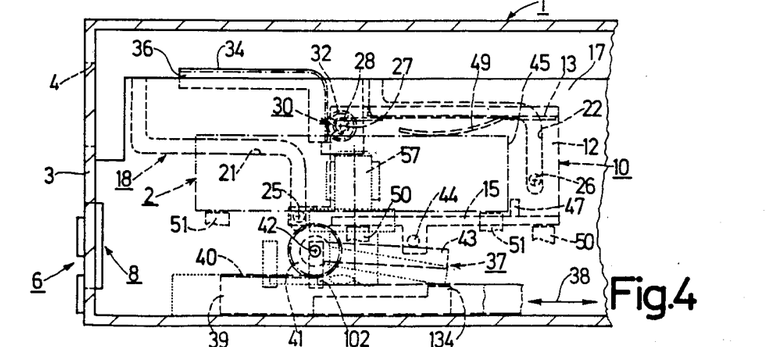
FIG. 4 is a partial side sectional view showing the cassette holder in its operating position.

Referring to FIGS. 2 to 4, the cassette holder 10 is substantially shaft-like in shape and has two side walls 11 and 12, a continuous top wall 13 connecting the two side walls and two base sections 14 and 15 extending toward one another from respective side walls 11 and 12. The cassette holder 10 is arranged so as to be movable parallel to its side walls 11 and 12 between a loading position as shown in FIGS. 2 and 3 and an operational position as shown in FIG. 4, along an L-shaped motional path running parallel and perpendicular to its top wall 13. A guide device 18 is provided between the cassette holder 10 and two guide panels 16 and 17 which are fixed in the unit and run parallel to the side walls 11 and 12. In each guide panel 16 and 17 the guide device 18 has two L-shaped guide grooves 19, 20 and 21, 22 respectively, determining the L-shaped motional path. Further, the holder 10 has on either side wall 11 and 12 two guide pins 23, 24 and 25, 26, respectively, projecting into the guide grooves 19, 20 and 21, 22, respectively. To enable the cassette holder to be fitted in the unit, the guide grooves each have at the ends facing the front panel an extension groove curving upwards and extending as far as the top end of the guide panels 16 and 17, and into whose open ends the guide pins can easily be inserted from above.

A displacement spring displaces the cassette holder 10 from the loading position to the operational position and a motor-driven displacement device displaces it from the operational position back to the loading position.

The displacement spring is formed by a cylindrical helical torsion spring 28 around a shaft 27 running perpendicular to the side walls 11 and 12 of the cassette holder device 10. The left-hand end, as seen in FIG. 3, of the helical torsion spring 28 acts upon the top wall 13 of the cassette holder device 10 and presses against it from below. The right-hand end of the helical torsion spring 28 is welded to the shaft 27. The shaft 27 snaps into partially open bearings 29 and 30 located in side walls 11 and 12 and is thereby journaled on the cassette holder 10. Mounted on the shaft 27 in the ivcinity of eacdh side wall 11 and 12 of the cassette holder 10 is a toothed gear 13 and 32. Each toothed gear 31 and 32 meshes with a tooth system 33 and 34 having the same L-shaped course as the motional path of the cassette holder 10 and provided on an L-shaped strip 35 and 36, each mounted on a guide panel 16 and 17. As a result of its initial tension, the prestressed helical torsion spring 28 urges the shaft 27 and the toothed gears 31 and 32 mounted on it in a clockwise direction as seen in FIG. 2 so that the toothed gears 31 and 32 move along the tooth systems 33 and 34 and displace the cassette holder 10 from its load position to its opertional position. This displacement of the cassette holder is only possible when the displacement device, which also acts upon the cassette holder device 10 and holds it in its load position against the force of the helical torsion spring 28, is set in motion as described in the following.

The helical torsion spring 28 has around 300 windings. In order to provide the helical torsional spring 28 with sufficient initial tension, the shaft 27 is rotated through approximately thirty revolutions in the same direction as this spring after being fitted into the cassette holder 10, whereupon the toothed gears 31 and 32 mesh with the L-shaped tooth systems 33 and 34. When the cassette holder 10 is moved from the load position into the operational position the shaft 27 rotates about three revolutions along with the toothed gears 31 and 32, causing the initial tension of the helical torsion spring 28 to decrease by only about 10%.

Referring still to FIGS. 2-4, displacement device 37 has a displacement slide 39 arranged so as to be movable longitudinally in opposite directions as indicated by the double arrow 38 between a neutral position shown in FIG. 2 and an intermediate position shown in FIG. 4 and further to a displacement position shown in phantom in FIG. 4. The displacement slide 39 has a tooth system 40 which drives a toothed gear 41 when the displacement slide 39 is moved from its neutral position to its intermediate position. The toothed gear is fixed on a shaft 42, which is journaled in the guide panel 17. Also fixed on the shaft 42 is a displacement lever 43, which cooperates with a displacement pin 44 projecting from the side wall 12 of the cassette holder 10 towards the guide panel 17. When the cassette holder 10 is in its loading position, the displacement pin 44 is held against the displacement lever 43 by the force of the helical torsion spring 28, which endeavors to displace the cassette holder out of its loading position, and the displacement lever in turn is held via the displacement slide 39.

When the cassette holder device 10 is in its loading position a cassette 2 can be inserted into it manually until the front of the cassette 2 comes up against two tabs 46 and 47, which project from the base sections 14 and 15 towards the top wall 13. Two metal leaf springs 48 and 49 mounted on the top wall 13 by gluing or ultrasonic welding press on cassette 2, so that it rests securely against the base sections 14 and 15. the motor driven displacement slide 39 is then shifted from its neutral position to its intermediate position so that the displacement lever 43 is driven in a clockwise direction as seen in FIG. 2. The initial tension of the prestressed helical torsion spring 28 drives the shaft 27 and the two toothed gears 31 and 32 in a clockwise direction so that the toothed gears 31 and 32 move along the fixed tooth systems 33 and 34 and enter openings in the guide panels 16 and 17, thus displacing the cassette holder along the L-shaped motional path from its loading position to its operational position. During this displacement the displacement pin 44 remains pressed against the displacement lever 43, thus bringing about a uniform displacement motion for the cassette holder until its base sections 14 and 15 abut four stops 50, which delimit the operational position. When the cassette holder 10 is held in the operational position by tension of spring 28, the cassette 2, which is then also in its operational position, is pressed against four positioning stops 51 by means of the leaf springs 48 and 49.

In order to move the cassette holder 10 back from its operational position to its loading position, the displacement slide 39 is displaced from its intermediate position to its neutral position against the force of the helical torsion spring 298. As soon as the cassette holder reaches its loading position, shown in FIG. 2, the drive for the displacement slide 39 is switched off by means of a limit switch.

Figure 5:
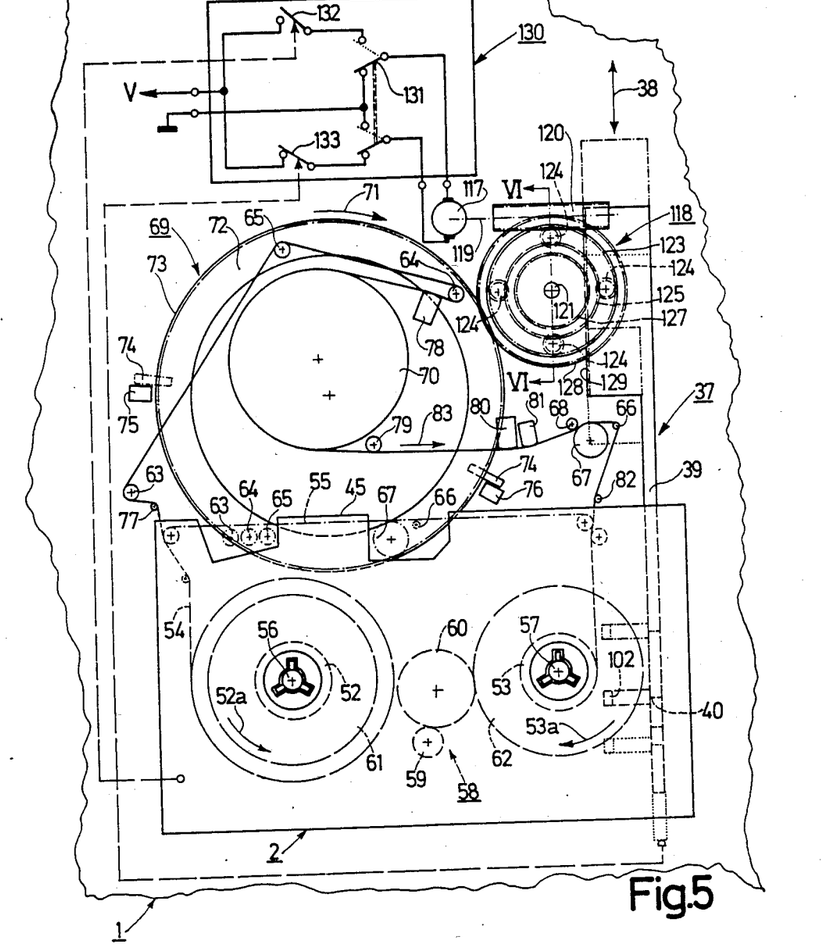
FIG. 5 is a schematic partial plan view showing the tape threading device and the differential gear.

As a cassette 2 is lowered into its operational position, shown schematically in FIG. 5, two capstans 56 and 57 come into drive linkage with the two adjacent, drivable rotating reel hubs 52, 53 of the cassette 2, between which the magnetic tape 54 inside the cassette 2 runs along the path indicated partially by a dot-dash line 55 and onto which the magnetic tape according to its respective direction of motion as indicated by the arrows 52a and 53a, can be wound.

Figure 7:
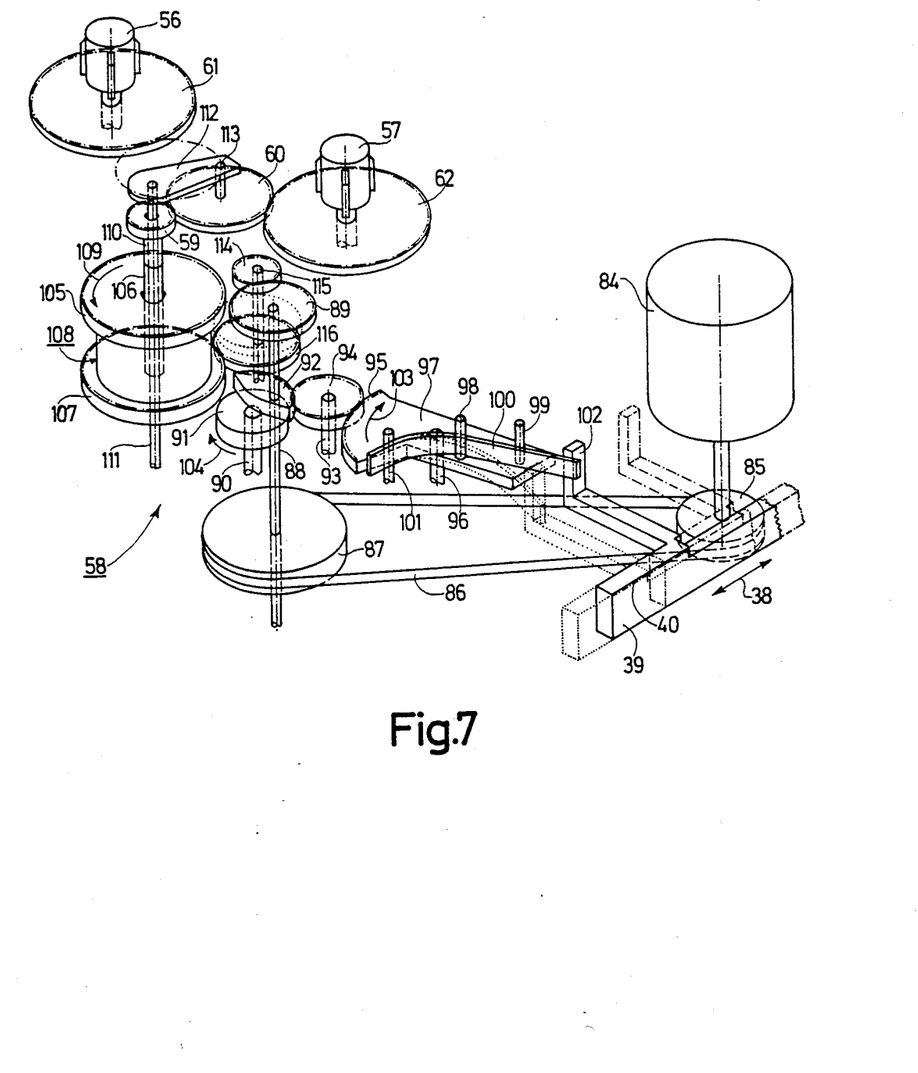
FIG. 7 is a schematic perspective of the winding disc drive with components exploded in the axial direction.

Referring to FIGS. 5 and 7, the two capstans 56 and 57 are driven by a winding disc device 58 which is movable between two operational positions by means of displacement slide 39. The winding disc drive device 58 has a fixed drive wheel 59 which can be driven by a motor in opposite directions of rotation and which drives a horizontally pivoted driven gear 60, which can be brought into drive linkage optionally, according to its direction of rotation, by means of one of two winding discs 61 and 62 fixed to the capstans 56 and 57.

When the cassette 2 is lowered into its operational position a cassette cover provided on the front 45 of the cassette and not shown is opened, so that a cassette opening in the front is unblocked. In addition four tape guides 63, 64, 65 and 66 and a pinch roller 67, which at this time are in a neutral position shown in FIG. 5 by dot-dash lines, enter two recesses of the cassette 2, whereupon they engage behind the section of the magnetic tape 54 running along the dot-dash line 55. After the cassette has been lowered into its operational position, the tape guides 63, 64, 65 and 66 can each be moved into their respective operational positions shown in FIG. 5 by continuous lines, so that the pinch roller 67 is now also movable to an intermediate position, not shown in FIG. 5, in the immediate vicinity of a tape drive shaft 68. The magnetic tape 54 can now be transported out of the cassette 2 through the opening in its front 45. From the intermediate position the pinch roller 67 is movable to its operational position, shown in FIG. 5, in which it presses the magnetic tape 54 against the tape drive shaft 68. Since the devices for opening the cassette cover, for displacing the tape guides 63 and 66 and the pinch roller 67 and for pressing the pinch roller 67 against the tape drive shaft 68 are not essential to the present invention, they are for simplicity's sake not shown. Such devices are generally known from existing units of this type.

The tape guides 64 and 65 are component parts of a tape threading device 69, which is provided for transporting the magnetic tape 54 out of the cassette 2 and for winding it around a drum-shaped scanning device 70 for the magnetic tape. The tape threading device 69 is movable between an unthreaded position shown in FIG. 5 by dot-dash lines, in which its tape guides 64 and 65 engage behind the magnetic tape 54 housed in the cassette 2, and a threaded position shown in FIG. 5 by continuous lines. When the tape threading device is displaced in the direction of the arrow 71 from its unthreaded position to its threaded position, the tape 54 is wound around the scanning device 70 by means of its tape guides 64 and 65. The tape threading device 69 consists essentially of a ring 72 which is rotatable around the scanning device 70 and on which the tape guide 64 is rigidly mounted and on which the tape guide 65 is mounted via a carrier, not shown, which is movable with respect to the ring in the circumferential direction of the ring, as has been proposed in DE-AS No. 20 46 494. The ring 72 has on the upper face of its periphery a tooth system 73, via which it can be driven rotationally in opposite directions, as will be described below. In order to determine the unthreaded position and the threaded position of the tape threading device 69, a radially projecting stop 74 on the ring 72 abuts bumper 75 in the unthreaded position and bumper 76 in the threaded position.

After the tape guides 63, 64, 65 and 66 and the pinch roller 67 have moved to their operational positions, the magnetic tape 54 occupies the course shown in FIG. 5 by a continuous line. In this position the magnetic tape 54 extends from the reel hub 52 past two tape guides contained in the cassette, a tape tension sensor 77, the movable tape guides 63, 65 and 64, a fixed magnetic head 78 for erasing all signals recorded on the magnetic tape, the drum-shaped scanning device 70, which contains drivable rotating magnetic heads for recording and reproducing video signals onto and from adjacent tracks running oblique to the longitudinal direction of the magnetic tape, a fixed tape guide 79, a fixed magnetic head 80 for erasing audio signals from an audio track running in the longitudinal direction of the magnetic tape, a further fixed magnetic head 81 for recording and reproducing audio signals onto and from the audio track and for recording and reproducing synchronisation signals onto and from a synchronisation track running in the longitudinal direction of the magnetic tape and parallel to the audio track, the tape drive shaft 68, against which the magnetic tape 64 is pressed by the pinch roller 67, the movable tape guide 66, a fixed tape guide 82 and two further tape guides contained in the cassette, and finally to the reel hub 62.

When video signals are being recorded or reproduced, the tape drive shaft 68, which is connected to a flywheel, not shown, can be driven optionally in one of two directions of rotation at a constant speed. In this way the magnetic tape 54, when the pinch roller 67 is pressed against the tape drive shaft 68, can be driven optionally in one of two opposite directions at a constant rate of travel. When the tape drive shaft 68 is driven at a given speed in an anticlockwise direction, the magnetic tape 54 is driven in the direction of the arrow 83, which corresponds to the so-called "normal forward", in which the recording of the signals and the normal reproduction of them are carried out. If the tape drive shaft 68 is driven at the same speed but in a clockwise direction, the magnetic tape 54 is driven in the opposite direction to the arrow 83, corresponding to the so-called "normal rewind", which is also referred to as "reverse run", in which reverse motion sequences are produced.

When the magnetic tape 54 is driven in "normal forward", the winding disc drive device 58 is brought into drive linkage with the winding disc 62, which drives the capstan 57 so as to wind the magnetic tape 54 onto the reel hub 53, as shown in FIGS. 5 and 7. When the magnetic tape 54 is driven in "reverse run", the winding disc drive device 58 is brought into drive linkage with the winding disc 61, which drives the capstan 56 to wind the magnetic tape 54 onto the reel hub 52, as shown in FIG. 7 by a dotted line. Less frictional force acts upon the tape section running between the tape drive shaft 68 and the reel hub 53 during "normal forward" than upon the tape section running between the tape drive shaft 68 and the reel hub 52 during "reverse run". This is because only four tape guides cooperate with the former tape section, whereas seven tape guides, three fixed magnetic heads and the drum-shaped scanning device cooperate with the latter tape section. So that themagnetic tape is always wound faultlessly onto the appropriate reel hub with the minimum of energy expenditure, when in "normal forward" the reel hub 53 should be driven at a given torque. When in "reverse run", the reel hub 52 should be driven at a given second torque which is larger than the first torque, thus achieving an adjustment to the differing tape loads due to the differing magnitudes of frictional force. This is achieved in a simple manner by means of the winding disc drive device 58 shown in FIG. 7, which is described below.

As mentioned above, the functions "fast forward" and "fast rewind" can also be stated in the unit 1, whereupon the magnetic tape 54 is wound between the reel hubs 52 and 53 at a faster rate by lifting the pinch roller 67 off the tape drive shaft 68. For the purpose of fast winding the magnetic tape 54 is transported in its entirety back into the cassette 2 by the appropriate reverse displacement of the movable tape guides 63, 64, 65 and 66 and of the pinch roller 67, whereupon it then occupies the course shown by the dot-dash line 55. Another possibility, however, would be to displace the pinch roller 67 only as far as its intermediate position during fast winding and to leave the movable tape guides 63, 64, 65 and 66 in their respective operational positions. During the fast winding, substantially the same frictional forces are exerted constantly upon the magnetic tape 54, irrespective of the direction of travel, so that the two capstans 56 and 57 can be driven at the same torque in both functions. Also in these two functions the two capstans 56 and 57 can be driven by the winding disc drive device 58, which in the "fast foward" function can be brought into drive linkage with the winding disc 62 and in the "fast rewind" function with the winding disc 61, also described below.

At this point it should be mentioned that a winding disc drive device 58, as provided in the present unit, has already been described in detail in the earlier Austrian patent application No. A 581/85, so tht only a brief description follows. The winding disc drive device 58, movable between two operational positions, is shown in FIG. 7, through the mountings of the shafts in a unit-mounted chassis panel are not shown so as to make the drawing simpler. The winding disc drive device 58 has a reversible motor 84, by means of which a first pulley 85 can be driven. The pulley 85 drives a second pulley 87 via a belt 86 and this second pulley is fixed via a shaft 88 to a change-over toothed gear 89, which can be displaced according to the two operational positions of the winding disc drive device 58 by means of the displacement slide 39. The shaft 88 is pivoted on a disc 91 horizontally rotated around a shaft 90, with the shaft 88 being arranged eccentrically with respect to the shaft 90. The disc 91 carries a substantially sector-shaped toothed disc component 92, which is also pierced by the shaft 88 and which has a tooth system on its upper face, which tooth system constantly meshes with a displacement toothed gear 94 which can be rotated around a shaft 93. The displacement toothed gear 94 can be driven by a tooth system 95 which is provided at one end of a displacement lever 97 horizontally pivoted about a shaft 96. The displacement lever 97 carries two pins 98 and 99, between which a leaf spring 100 is held under tension, whose end facing the tooth system 95 rests against a fixed pin 101 and whose other end projects into the travel of an L-shaped displacement extension 102 which projects from the displacement slide 39. The displacement extension 102 and the displacement slide 39, shown only partially in FIG. 7, are represented in the displacement slide's neutral position, intermediate position and displacement position by dot-dash, continuous and dotted lines respectively in FIG. 7.

When the displacement slide 39 is in the neutral position the displacement extension 102 is at a distance from the leaf spring 100 and the displacement lever 97 is pressed against the pin 101 under the force of teh leaf spring 100. When the displacement slide 39 is in the intermediate position the displacement extension 102 rests against the leaf spring 100, though without causing the displacement lever 97 to move via the leaf spring. In this intermediate position of the displacement slide 39, the displacement lever 97, the displacement toothed gear 94, the toothed disc component 92 together with the disc 91, as well as the changeover toothed gear 89 and the second pulley 87 occupy the positions shown in FIG. 7. This corresponds to the first operational position of the winding disc drive device 58, in which the "fast forward" and "fast rewind" functions can be effected. By moving the displacement slide 39 into its displacement position, shown by a dotted line, the displacement lever 97 is pivoted horizontally via the leaf spring 100 in the direction of the arrow 103, whereupon the toothed disc component 92 together with the disc 91 is pivoted horizontally via the displacement toothed gear 94 in the direction of the arrow 104. When this happens the second pulley 87 and the changeover toothed gear 89 are also pivoted horizontally and this continues until the changeover toothed gear 89 reaches a position, shown in FIG. 7 by dotted lines, in which it meshes with a first driving toothed wheel 105 of the winding disc drive device 58, whereupon the drive of the displacement slide 39 is automatically disengaged, as described below. This corresponds to the second operational position of the winding disc drive device 58, in which functions "normal forward" and "reverse run" can be effected.

The first driving toothed wheel 105 can thus, when the winding disc drive device 58 is in its second operational position, be driven via the changeover toothed gear 89 and the belt drive 85, 86 and 87 in either one of two directions of rotation according to the selected direction of rotation of the motor 84, corresponding to the "normal forward" and "reverse run" functions. The first driving toothed wheel 105 is pivoted on a tubular sleeve 106, which is moulded onto a second driving toothed wheel 107. In this way the two driving toothed wheels 105 and 107 are rotated coaxially with respect to one another. Provided between the two driving toothed wheels 105 and 107 is a clutch device 108, shown only schematically and described in detail in the above-mentioned patent application A No. 581/85, via which the second driving toothed wheel 107 can be driven by the first driving toothed wheel 105 in the "normal forward" and "reverse run" functions.

The clutch device 108 consists essentially of two slipping clutches, arranged between and coaxial to the two driving toothed wheels 105 and 107 and located one behind the other in the direction of the flow of force, which are constructed so as to transmit different magnitudes of torque, and of a one-way clutch, by means of which the slipping clutch for transmitting the smaller torque can be bypassed when driving the first toothed wheel 105, and hence the entire clutch device, 108 is rotating in the direction indicated by the arrow 109.

The second driving toothed wheel 107 is fixed via its moulded-on sleeve 106 and a further sleeve 110 pressed into this sleeve 106, to the drive wheel 59, constructed as a toothed gear, onto which the further sleeve 110 is moulded. The second driving toothed wheel 107 and the drive wheel 59 are journaled on a shaft 111. In addition, at the free end of the shaft 111 a lever 112 is slewable, on which the driven gear 60 is pivoted via a shaft 113, the driven gear 60 being constantly meshed with the drive wheel 59. According to the direction of rotation of the drive wheel 59, the driven gear 60 is automatically pivoted horizontally in opposite directions as a result of the intertial and frictional ratios, whereupon the driven gear meshes with one of the two winding discs 61 and 62, which are also constructed as toothed gears. In this way the second driving toothed wheel 107 is brought into drive linkage with one of the two capstans 56 and 57 via the drive wheel 59, the driven gear 60, and one of the two winding discs 61 and 62.

When the changeover toothed gear 89 is in the position shown in FIG. 7 by continuous lines corresponding to the first operational position of the winding disc drive device 58, it meshes with a first intermediate toothed gear 114, which is fixed to a second intermediate toothed gear 116 via a shaft 115. The second intermediate toothed gear 116 is constantly meshed with the second driving toothed wheel 107, so that in the "fast forward" and "fast rewind" functions the second driving toothed wheel 107 can be driven directly by the changeover toothed gear 89 via the two intermediate toothed gears 114 and 116, bypassing the first driving toothed wheel 105 and the clutch device 108.

In the "normal forward" function, in which the changeover toothed gear 89 is brought into drive linkage with the first driving toothed wheel 105 by the displacement slide 39 in its displacement position as shown in FIG. 7 by dotted lines, the first pulley 85 is driven in an anticlockwise direction at a given speed by the motor 84. This rotation is transmitted via the belt 86, the second pulley 87 and the changeover toothed gear 89 onto the first driving toothed wheel 105, which then rotates clockwise. The first driving toothed wheel 105 drives the second driving toothed wheel 107 via the slipping clutch device 108. The one-way clutch remains disengaged and slipping takes place in the slipping clutch for transmitting the smaller torque while the other slipping clutch for transmitting the larger torque behaves like an unrotatable clutch connection. The transmitted torque is thus determined by the slipping clutch for transmitting the smaller torque and thus has a smaller value. The torque transmitted to the driving toothed wheel 107 is transmitted via the sleeve 106 and the sleeve 110 to the drive wheel 59 and by this to the driven gear 60, which then rotates in an anticlockwise direction. As a result of this rotation the driven gear 60 is automatically pivoted horizontally towards the winding disc 62 and meshes with it, so that the winding disc 62, and hence the capstan 57 and the reel hub 53, is driven according to the smaller torque transmitted by means of the slipping clutch device 108. In the "reverse run" function the changeover toothed gear 89, as in the "normal forward" function, meshes with the first driving toothed wheel 105 by the displacement slide 39 in its displacement position. The first pulley 85 is driven by the motor 84 at the same speed as in the "normal forward" function, but now in a clockwise direction so that the first driving toothed wheel 105 rotates in an anticlockwise direction and drives the second driving toothed wheel 107 via the slipping clutch device 108. The one-way clutch is engaged and the slipping clutch for transmitting the smaller torque is bypassed and slipping takes place in the slipping clutch for transmitting the larger torque, so that the transmitted torque has a greater value. The larger torque transmitted to the second driving toothed wheel 107 is transmitted by the latter via the sleeve 106 and the sleeve 110 to the drive wheel 59 and by the latter to the driven gear 60, which then rotates in a clockwise direction and thus meshes automatically with the winding disc 61 and drives it. In this way the capstan 56, and hence the reel hub 52, is driven according to the larger torque transmitted by means of the slipping clutch device 108.

In the "fast forward" function, in which the displacement slide 39 occupies its intermediate position as shown in FIG. 7 by continuous lines and the displacement lever 97 is pressed against the unit-mounted pin 101 and the changeover toothed gear 89 meshes with the first intermediate toothed gear 114, the first pulley 85 is driven by the motor 84 in a clockwise direction, as in the "reverse run" function, but now at a higher speed. This rotation is transmitted via the belt 96 and the second pulley 87 to the changeover toothed gear 89 and by this via the first intermediate toothed gear 114 and the second intermediate toothed gear 116 directly to the second driving toothed wheel 107 and by this to the driven gear 60, which then rotates in an anticlockwise direction and meshes with the winding disc 62 and drives it at a higher speed. In the "fast rewind" function, in which the displacement slide 39 also occupies its intermediate position, the direction of rotation of the motor 85 is reversed, whereupon the driven gear 60 is driven in a clockwise direction via the same drive linkage as in the "fast foward" function, with the driven gear meshing with the winding disc 61 and driving it at a higher speed. In the "fast forward" and "fast rewind" functions, the two capstans 56 and 57 are driven at the same torque determined by the motor 84.

Figure 6:
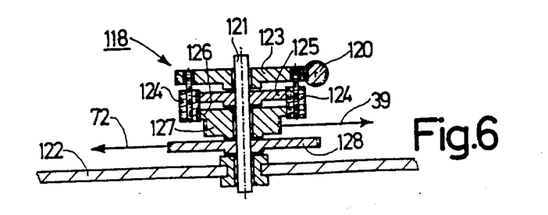
FIG. 6 is a sectional view of the differential gear, taken along line IV—IV of FIG. 5.

In order to displace the cassette holder 10 between its loading position and its operational position, the tape threading device 69 between its unthreaded position and its threaded position, as well as the winding disc drive device 58 between its two operational positions, the unit 1 has a differential gear 118 which can be driven by a motor 117 in opposed directions of rotation, as can be seen from FIGS. 5 and 6. The motor 117 drives, via its motor shaft 119 schematically shown by a dot-dash line, a worm 120, which drives a worm wheel 123 which is journaled on a shaft 121, which is journaled in a chassis panel 122. The worm wheel 123 forms a planet carrier of the differential gear 118 for four planet wheels 124, each of which is located on a shaft journaled in the worm wheel 123. The four planet wheels 124 mesh with two toothed gears 125 and 126 coaxial to the worm wheel 123 and which the same diameter but a different number of teeth. The tooth systems of the two toothed gears 125 and 126 are constructed with addendum modification and the gear 125 has more teeth then the gear 126. The toothed gear 126 is journaled on the shaft 121 and is integral with a first output toothed gear 127, which has a smaller diameter than the toothed gear 126 and which forms a first output of the differential gear 118. The toothed gear 125 is fixed on the shaft 121 and is fixed via the shaft 121 to a second output toothed gear 128 which forms a second output of the differential gear 118. The first output toothed gear 127 meshes with a tooth system 129 on the displacement slide 39 and the second output toothed gear 128 meshes with the tooth system 73 of the ring 72 of the tape threading device 69.

In order to control the motor 117, a control circuit 130, shown schematically in FIG. 5, is constructed using a microprocessor which controls the switching-on and switching-off of the supply voltage V for the motor 117 as a function of command signals entered and monitoring signals obtained by means of sensor switches. A bipolar change-over switch 131 and two unipolar switches 132 and 133 connected in series with the change-over switch 131 are constructed as normally closed contacts. In the switch position of the changeover switch 131 as shown in FIG. 5 by continuous lines, the motor 117 is driven in such a way that the worm wheel 123 of the differential gear 118 is driven in an anticlockwise direction as seen in FIG. 5, whereupon the cassette holder 10 is displaced from its loading position to its operational position, the tape threading device 69 is displaced from its unthreaded position to its threaded position, and the winding disc drive device 58 is displaced from its operational position for "fast forward" and "fast rewind" to its operational position for "normal forward" and "reverse run". When the change-over switch 131 is displaced to its switch position as shown in FIG. 5 by dotted lines, then the motor 117 is driven in such a way that the worm wheel 123 is driven in a clockwise direction as seen in FIG. 5, whereupon the winding disc drive device 58 is displaced from its operational position for "normal forward" and "reverse run" to its operational position for "fast forward" and "fast rewind", the tape threding device 69 is displaced from its threded position to its unthreaded position, and the cassette holder device 10 is displaced from its operational position to its loading position. The switch 132 is actuable by the cassette holder 10 and opens when the cassette holder reaches its loading position. The switch 133 is actuable by the displacement slide 29 and opens when the displacement slide 39 reaches its displacement position.

To play a tape, the user inserts a cassette 2 into the cassette holder 10, and operates the button for starting the "playback" function, which causes the change-over switch 131 to switch over the switch position shown in FIG. 5 by continuous lines. In this case the circuit for the motor 117 between the supply voltage V and reference voltage level is completed via the closed switch 133 and the change-over switch 131. The switch 132 is at this juncture still held in its open position by the cassette holder 10, which is in its loading position. The motor 117 drives the differential gear 118 via the worm 120, whereupon the worm wheel 123 rotates in an anticlockwise direction as seen in FIG. 5 and, via the planet wheels 124, endeavors to drive the first output toothed gear 127 in a clockwise direction and the second output toothed gear 128 in an anticlockwise direction. The direction of rotation of the two output toothed gears 127 and 128 are brought about as a result of the selected number of teeth of the toothed gears 125 and 126 meshing with the planet wheels 124. At this point the first output toothed gear 127 of the differential gear 118 is loaded by the cassette holder 10 and the second output toothed gear 128 is loaded by the tape threading device 69. Since the cassette holder 10 is loaded by the force of the helical torsion spring 28 in such a way that this load supports the torsion of the first output toothed gear 127 in a clockwise direction via the displacement slide 39, the tape threading device occasions a greater load on the second output toothed gear 128 than the cassette holder 10 occasions on the first output toothed gear 127 of the differential gear. As a result, when the second output toothed gear 128 is stationary, with the tape threading device 69 in its unthreaded position, the differential gear 118 displaces the displacement slide 39 from its neutral position via the fist output toothed gear 127. This pivots the displacement lever 43 so that the cassette holder moves from its loading position to its operational position by the force of the helical torsion spring 28. When the cassette holder device 10 has left its loading position the switch 132 closes, though for the moment this has no effect. As soon as the cassette holder 10 reaches it operational position it is pressed against the stops 50. The force of the helical torsion spring 28 is absorbed by the stops 50 and no longer retroacts upon the differential gear 118 via the first output toothed gear 127. At this point the displacement slide 39 has reached its intermediate position, in which its displacement extension 102 comes into contact with the leaf spring 100, without causing the displacement lever 97 to move via the leaf spring 100. The leaf spring 100 occasions a greater load on the first output toothed gear 127 than the load occasioned by the tape threading device 69 on the second output toothed gear 128 so that the displacement slide 39 is now held in its intermediate position and the differential gear drives the spring 27 of the tape threading device 69 via the second output toothed gear 128, whereupon the tape threading device moves out of its unthreaded position. Coupled with this displacement of the tape threading device is the displacement of the pinch roller 67 to its intermediate position in the vicinity of the tape drive shaft 68. The tape threading device 69 is driven until the stop 74 mounted on the ring 72 abuts buffer 76, whereupon the ring 72 and the second output toothed gear 128 of the differential gear 118 are blocked. As a result the load on the second output toothed gear is greater than the load occasioned by the leaf spring 100 on the first output toothed gear 127 so that gear 127 is driven once more, and it thus displaces the displacement slide 39 from its intermediate position. When this happens the toothed gear 41 is briefly driven via the tooth system 40, whereupon the tooth system 40 disengages from the toothed gear 41. This interrupts the drive linkage between the differential gear 118 and the cassette holder 10, whereupon the free end of the displacement lever 43 thus lifted off the displacement pin 44 is pressed against a unit-mounted stop 124. When the displacement slide 39 moves again, the displacement lever 97 is pivoted horizontally in the direction of the arrow 103 via the displacement extension 10 of the displacement slide and the leaf spring 100 of the displacement lever 97, which results in a displacement of the winding disc drive device 58 from its first to its second operational position. At the same time the pinch roller 67 is displaced by the displacement slide 39 towards the tape drive shaft 68. The displacement of the displacement slide 39 continues until it reaches its displacement position shown schematically in FIG. 5, where it comes up against the switch 133, which thus opens and stops the motor 117. The winding disc drive device 58 is now held in its second operational position by the buffer 76 against the force of the leaf spring 100 via the displacement slide 39, the first output toothed gear 127, the toothed gear 126, the planet wheels 124 carried by the planet carrier, which is blocked by the self-locking of the worm drive, the toothed gear 125, the second output toothed gear 128, the ring 72 and its stop 74. The tape threading device 69 is now held in its thread position, in which the stop 74 is pressed against the buffer 76 by the leaf spring 100 via the displacement slide 39 and the force flow chain described above. The cassette holder 10 is now held displaced in its operational position by the helical torsion spring 28. At the end of the sequence of functions described above the cassette 2 is in its operational position, the magnetic tape 54 is wound around the scanning device 70 and the magnetic heads 78, 80 and 81 and pressed against the tape drive shaft 68 by means of the pinch roller 67, and the winding disc drive device 58 occupies its second operational position for "normal forward" or "reverse run", so that the desired reproduction process can now take place.

After playing, an "eject" button is operated by the user, which causes the changeover switch 131 to switch to the switch position indicated in FIG. 5 by dotted lines, as a result of which the motor circuit for the motor 117 is completed via the previously closed switch 132 and the changeover switch 131 closes. When this happens the switch 133 is held in its open position by the displacement slide 39. In this case the motor 117 is driven in the opposite direction of rotation and the worm 120 now drives the worm wheel 123 in a clockwise direction as seen in FIG. 5. The worm wheel 123 now endeavors to drive the first output toothed gear 127 in an anticlockwise direction and the second output toothed gear 128 in a clockwise direction. The leaf spring 100 thus supports the rotation of the first output toothed gear 127, so that the winding disc drive device 58 loads the gear 127 less than the threading device 69 loads the gear 128. As a consequence the displacement slide 39 moves toward its intermediate position, which displacement is supported by the leaf spring 100 acting upon the displacement extension 102. As soon as the displacement slide 39 leaves its displacement position the switch 133 closes, which for the moment has no effect. As a result of the force of the leaf spring 100, which is pressing against the stop 101 and is held under tension between the two pins 98 and 99 on the displacement lever 97, the winding disc drive device 58 is moved back from its second operational position to its first operational position and the pinch roller 67 is moved back to its intermediate position, via the displacement lever. Just before the displacement slide 39 reaches its intermediate position, its tooth system 40 again meshes with the toothed gear 41 of the displacement device 37 for the cassette holder 10. As soon as the displacement lever 97 comes up against the unit-mounted stop 101, the dynamic effect of the leaf spring 100 acting upon the displacement extension 102 of the displacement slide 39 is neutralised and the load exerted by the winding disc drive device 58 on the first output toothed gear 127 of the differential gear 118 is removed. The displacement slide 39 has thus reached its intermediate position. At this point the tape threading device 69, which is in its threaded position, acts upon the second output toothed gear 128 and the cassette holder 10 acts upon the first output toothed gear 127, which is loaded by the helical torsion spring 28 in a clockwise direction. The load exerted on the first output toothed gear 127 is greater than the load exerted on the second output toothed gear 128 by the tape threading device 59 so that slide 39 is now held in its intermediate position via the first output toothed gear 127 and the tape threading device 69 is moved back out of its threaded position and the pinch roller is moved back out of its intermediate position, via the second output toothed gear 128. This displacement process continues until the stop 74 mounted on the ring 72 comes up against the unit-mounted buffer 75, as a result of which the ring 72 and gear 128 are blocked. The gear 127 is then again driven, which moves the displacement slide 39 from its intermediate position back to its neutral position, whereupon the displacement lever 43 moves the cassette holder 10 back to its loading position, where it opens switch 132 and stops the motor 117. The cassette holder 10 is held in its loading position by the buffer 75 against the force of the helical torsion spring 28 via the displacement device 37, the displacement slide 39, the first output toothed gear 127, the toothed gear 126, the planet wheels 124 carried by the planet carrier 123, which is blocked by the self-locking of the worm drive, the toothed gear 125, the second output toothed gear 128, the ring 72 and its stop 74. The tape threading device 69 is held in its unthreaded position, in which the stop 74 is pressed against the buffer 75, by the helical torsion spring 28 via displacement device 37, the displacement slide 39 and the previously mentioned force flow chain. The winding disc drive device 58 is held in its first operational position by the leaf spring 100. The cassette 2 can now be removed manually from the unit.

Clearly the control circuit 130 may be provided with further sensor circuits to interrupt the sequence of movement at given junctures. For example, a sensor circuit may be provided which as soon as the cassette holder device is displaced from its load position to its operational position interrupts the motor circuit for the motor 117, whereupon a cassette 2 is lowered into its operational position, through the tape threading device 69 does not transport the magentic tape 54 out of the cassette 2 and the winding disc drive device 58 remains in its first operation position for the "fast forward" and "fast rewind" functions. In this operational situation the magnetic tape 54 left in the cassette 2 can then be wound at a higher tape speed in the "fast forward" or "fast rewind" functions.

The motor-driven differential gear is thus used not only to displace the tape threading device and the winding disc drive device, but also to displace the cassette recording device. For this purpose the displacement slide provided to displace the winding disc drive device is also used to displace the cassette holder device. It follows that the reversal between the two outputs of the differential gears is effected in a particularly simple manner by the use of the spring tension of springs contained in the unit devices to be displaced by the displacement slide.

Figure 8:
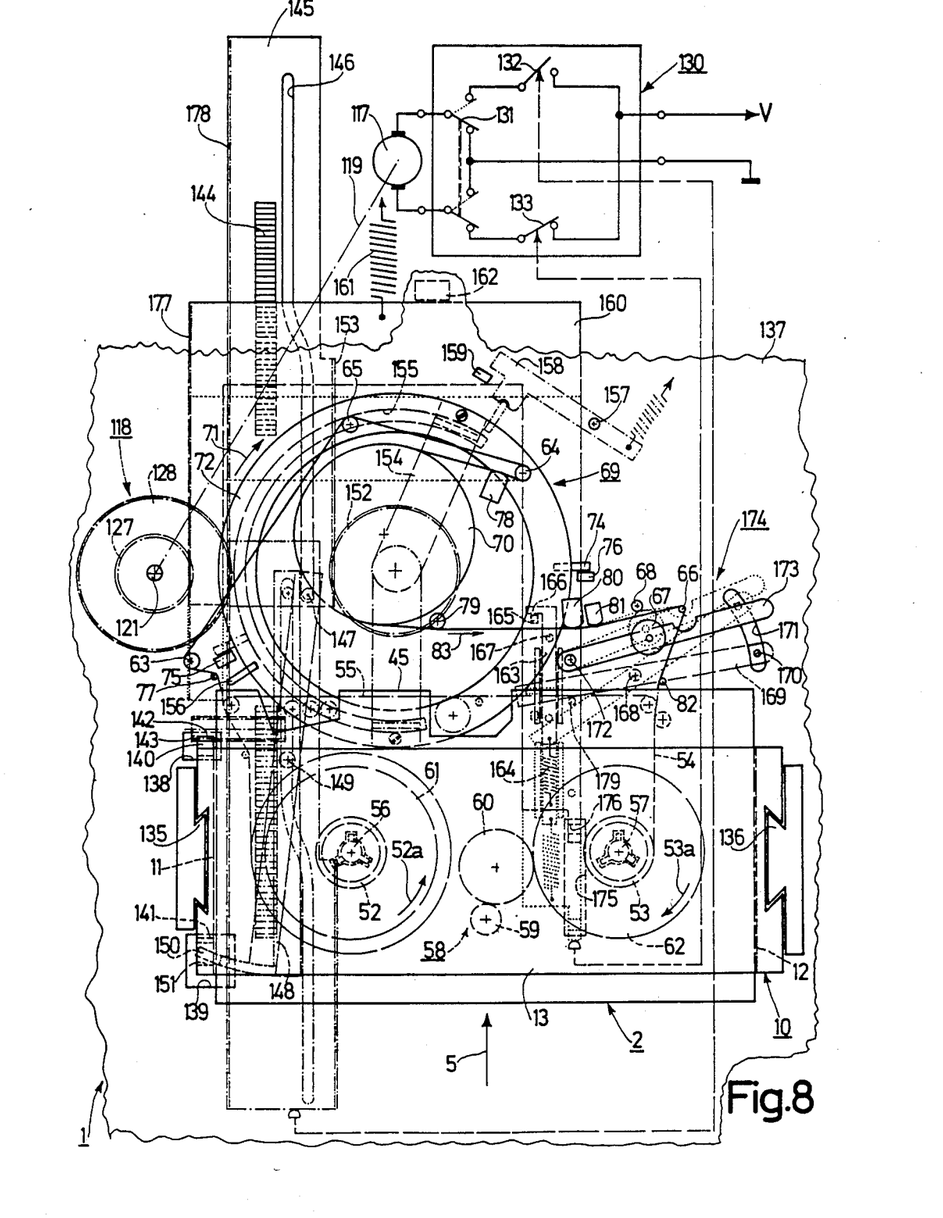
FIG. 8 is a schematic partial plan view of a second embodiment, in which a cassette is inserted through a top panel, showing the tape threading device and the differential gear.

A second embodiment of the recording and playback unit 1 shown in FIG. 8 has a cassette holder 10 arranged so as to be movable perpendicular to its top wall 13 by means of two dovetailed guide strips 135 and 136 projecting perpendicularly upwards from the chassis panel 137. The cassette holder 10 side wall 11 adjacent to the guide strip 135 has two strip-shaped wall extensions 140 and 141 running perpendicular to the to wall 13, each one projecting downwards through the chassis panel 137 via an opening 138 and 139 in the chassis panel. The wall extension 140 is provided with a tooth system 142, which meshes with a cylindrical toothed gear 143. The toothed gear 143 can be driven by a tooth system 144, which is provided on a slide 145 which is longitudinally movable underneath the chassis panel 137. The slide 145 is movable between a neutral position shown in FIG. 8 by dot-dash lines and an operational position shown by continuous lines. The slide 145 has a slot 146 provided as a control crank and pierced by a pin 147 provided as a sliding block. The pin 147 is mounted on an arm of a two-armed locking lever 148, which is slewable about a shaft 149 tunning on bearings in the chassis panel 137. The locking lever 148 has a locking tab 150 projecting from the end of its arm, which tab enters an opening 151 in the wall extension 141 projecting from the side wall 11 to lock the cassette holder device 10 in its operational position.

The tape threading device 69 has substantially the same construction as that of the unit shown in FIGS. 1 to 7. The ring 72 is driven by a toothed gear 152 provided beneath the chassis panel 137 and coaxial to the ring 72, and driven by a tooth system 153 provided on the slide 145. The toothed gear 152 is connected to an arm 154 projecting from it in a radial direction and whose free end is bent upwards in an L-shape through a slot 155 arrenged coaxially to the ring 72 and located in the chassis panel 137. The L-shaped end of the arm 154 is screwed to the ring 72. In order to hold the tape threading device 69 in its unthreaded position, a finger 156 is mounted on the top of the ring 72, the rounded, free end of which, when the tape threading device is in its unthreaded position, is held by means of the notch in arm 158, spring-loaded and slewable about a shaft 157, as shown in fig. 8 by dot-dash lines. When the tape threading device is displaced from its unthreaded position, the arm 158 is pressed against a stop 159.

The unit as shown in FIG. 8 has a second slide 160, which is constructed in a U-shape and is arranged so as to be movable in the same direction as the slide 145 and upon whose crossbar a return spring 161 acts, which pulls slide 160 against a stop 162 projecting from the chassis panel 137. The U-shaped slide 160 is movable between a neutral position shown by means of continuous lines, in which the crossbar of the slide 160 is pressed against the stop 162 by the effect of the spring 161, and an operational position shown by dotted lines. Mounted on one arm of the U-shaped slide 160 is an actuating slide 163 movable longitudinally in the direction of the arm and restrained with respect to the U-shaped slide by means of a spring 164 and which has, so as to be pressed against a stop 165 provided on the U-shaped slide, a tab 166 projecting transversely from it. The actuating slide 163 carries an actuating pin 167 which projects from it and into whose displacement path one arm of a two-armed swivel lever 169 projects, which is slewable about a shaft 168 running on bearings in the chassis panel and which carries a pin 170 at the end of its second arm. The pin 170 extends upwards through a slot 171 in the chassis panel 137 and cooperates with a pinch roller lever 173 which carries the pinch roller 67 and is slewable about a shaft 172. The shaft 172 of the pinch roller lever 173 is mounted on a carrier, not shown, which is movable between two positions, this displacement being coupled to the displacement of the tape threading device between its unthreaded position and its threaded position. In one of the two positions of the carrier the pinch roller 67 occupies the position shown by dot-dash lines, in which it engages behind the magnetic tape housed in the cassette. In the other of these two positions the pinch roller 67 occupies the position shown by continuous lines, in which it lies next to the tape drive shaft 68. Between the carrier and the pinch roller lever a spring is operative, which endeavours to hold the pinch roller lever pressed against a stop on the carrier, whereupon the pinch roller is lifted off the tape drive shaft. The pinch roller 67 and the pinch roller lever 173 form a pinch roller device 174, which represents a tape run operating device movable between two operational positions. In the operational position of the pinch roller device 174 as shown in FIG. 8 by continuous lines, the pinch roller 67 is lifted off the tape drive shaft 68, whereupon fast winding can be effected. By displacing the U-shaped slide 160 into its operational position the pinch roller device 174 is movable into its second operational position, shown in FIG. 8 by dotted lines, in which the pinch roller 67 is held pressed against the tape driver shaft 68, whereupon the magnetic tape can be driven in "normal forward" or "reverse run". The winding disc 61 or 62 is driven by means of the winding disc drive device 58, which is constructed as in the unit shown in FIGS. 1 to 7 and is movable between two operational positions by means of the U-shaped slide 160, for which purpose the latter has a displacement extension 176 projecting upwards through a slot 175 in the chassis panel 137, which displacement extension has the same function as the displacement extension 102 of the displacement slide 139 of the unit shown in FIGS. 1 to 7.

The unit shown in FIG. 8 has the same differential gear 118 as is provided in the unit shown in FIGS. 1 to 7, the drive of the differential gear also being effected in the same way. The first output toothed gear 127 meshes constantly with a tooth system 177 provided on the second arm of the U-shaped slide 160 and the second output toothed gear 128 meshes constantly with a tooth system 178 on the slide 145. The control circuit for the motor 117 has the same construction as that of the unit shown in FIGS. 1 to 7. In the present unit the switch 132 is held open by the slide 145 in its neutral position. The switch 133 is held open by the U-shaped slide 160 in its operational position.

When the unit is not in use the slide 145 is in its neutral position, shown in FIG. 8 by dot-dash lines, and the U-shaped slide 160 is in its neutral position, shown in FIG. 8 by continuous lines. If, after a cassette 2 is inserted manually into the cassette holder 10, the changeover switch 131 is switched to the position shown in FIG. 8 by continuous lines, the circuit for the motor 117 is completed via the switch 133. The motor 117 is driven in such a way that a driving force in a clockwise direction is exerted upon the first output toothed gear 127 and a driving force is anticlockwise direction is exerted upon the second output toothed gear 128, via the differential gear 118 in the same way as in the unit shown in FIGS. 1 to 7. Because the U-shaped slide 160 is acted upon by the return spring 161, which opposes the driving force exerted upon the first output toothed wheel 127, and because at this point such a load opposing the driving force is not exerted upon the second output toothed gear 128, the first output toothed gear 127 is more loaded than the second output toothed gear 128 which is displaced in an anticlockwise direction and displaces the slide 145 from its neutral position via the tooth system 178. As soon as the slide 145 leaves its neutral position the switch 132 closes. When the slide 145 moves, its tooth system 144 meshes with the cylindrical toothed gear 143 and drives the cassette holder from its load position. When the cassette holder 10 reaches its operational position the tooth system 144 disengages from the toothed gear 143 and the locking lever 148 is pivoted clockwise as the slide 145 is displaced further via its slot 146 and the pin 147 located on the locking lever 148. When this happens the locking tab 150 enters the opening 151 in the wall extension 141 projecting from the side wall 11 and locks the cassette holder 10 in its operational position. The locking tab 150 may also be a sprung construction and have a displacement bevel which, when it enters the opening 151, loads the wall extension 141 in the direction of the operational position so that the cassette holder device is held securely in its operational position. When the slide 145 moves further its tooth system 153 engages the toothed gear 152 to drive the ring 72 via the arm 54 in a clockwise direction. The tape threading device 69 is thus displaced from its unthreaded position so that the finger 156 disengages the notch arm 158. When the notch connection is released a load is exerted upon the second output toothed gear, which because of the selected dimensions of the notch connection and of the return spring 161 is less than the load exerted upon the first output toothed gear 127 by the return spring 161 via the U-shaped slide 160, so that the second output toothed gear 128 continues to be driven. In the threaded position the stop 74 abuts the buffer 76, so that the ring 72 and the second output toothed gear 128 are blocked against further displacement. As a result the load on the second output toothed gear 128 is more than the load on the first output toothed gear 127, so that the differential gear 118 now drives the first output toothed gear 127 in a clockwise direction, whereupon the U-shaped slide 160 is displaced from its neutral position against the force of the return spring 161. In the course of this displacement the actuating pin 167 comes up against the swivel 169, the pin 170 of which in turn comes up against the pinch roller lever 173. When the U-shaped slide 160 is displaced further the pinch roller device 174 is displaced until the pinch roller 67 comes up against the tape drive shaft 68. The pitch roller lever 173, the swivel lever 169, and the actuating slide 163 are then blocked against my further displacement, so that when the U-shaped slide 160 is displaced further the spring 164 is tightened between the actuating slide 163 and the U-shaped slide 160 and thus supplies the contact pressure by means of which the pinch roller 67 is pressed against the tape drive shaft 68. When the pinch roller device 174 is displaced, the winding disc drive device 58 is displaced to its operational position corresponding to functions "normal forward" and "reverse run". When the U-shaped slide 160 reaches the operational position (dash/dot line) its one arm comes up against the switch 133, so that the circuit for the motor 117 is interrupted and the motor stops running. The pinch roller device 174 and the winding disc drive device 58 are held in their operational positions by the unit-mounted buffer 76 against the stop 74 through the force exerted by the return springs integrated in the pinch roller device and in the winding disc drive device and by the springs 164 and 161. The tape threading device 69 is thus held securely in its threaded position. The cassette holder 10 is now locked in its operational position by the locking tab 150 of the locking lever 148. Recording can now be effected in the same manner as in the unit shown in FIGS. 1 to 7.

To remove a cassette from the unit, the change-over switch 131 is switched to its switch position in FIG. 8 by dotted lines by operation of a button, whereupon the circuit for the motor 117 is completed via the previously closed switch 132 and the motor 117 is driven in such a way that a driving force is exerted upon the first output toothed gear 127 in an anticlockwise direction and a driving force is exerted upon the second output toothed gear 128 in a clockwise direction, via the differential gear 118. Since the driving force exerted upon the first output toothed gear 127 is supported by the return spring 161, the U-shaped slide is displaced from its operational position and the switch 133 closes. When the U-shaped slide 160 is displaced, the pin 178 projecting from it comes up against the swivel lever 160 and carries it along, and the spring operative between the pinch roller lever 173 and its carrier, not shown, lifts the pinch roller 67 off the tape drive shaft 68, so that the pinch roller is displaced to its position shown in FIG. 8 by continuous lines. The pinch roller device 174 thereby returns to its original operational position. Also, the tab 166 of the actuating slide 163 is again pressed by the spring 164 against the stop 165 on the U-shaped slide 160. Moreover, the displacement extension 176 frees the winding disc drive device 58 for displacement to its first operational position corresponding to the "fast forward" and "fast rewind" functions. When the U-shaped slide 160 reaches the neutral position it comes up against the stop 162, after which the first output toothed gear 127 is blocked. As a result the differential gear 118 now drives the second output toothed gear 128 in a clockwise direction as seen in FIG. 8, whereupon the tape threading device 69 is initially displaced from its threaded position. The moment the tape threading device 69 reaches its unthreaded position the tooth system 153 disengages from the toothed gear 152 and the finger 156 enters the notch on arm 158. When the slide 145 is displaced further the locking lever 148 pivots anticlockwise by the pin 147 in the slot 146, whereupon the locking tab 150 comes out of the wall extension 141, so that the cassette holder device 10 is freed for displacement. When the slide 145 is displaced further, its tooth system 144 meshes with the cylindrical toothed gear 143, which drives the cassette holder 10 to its loading position so that switch 132 opens, which results in the motor 117 stopping. Then the cassette holder device 10 is held in its loading position by the stop 162 via the toothed gear 143, the slide 145, the second output toothed gear 128, the toothed gear 125, the planet wheels 124 held rigid by the planet carrier 123, which is blocked by the self-locking of the worm drive, the toothed gear 126, the first output toothed gear 127 and the U-shaped slide 160. The tape threading device 69 is held in its unthreaded position by the notch arm 158. The pinch roller device and the winding disc drive device are held in their original operational positions by the return springs integrated in them. The cassette can now be removed manually from the unit.

In the present unit the cassette holder and the tape threading device are movable via one output of the differential gear, while the tape run operating devices, namely the pinch roller device and the winding disc drive device, are movable via the other output of the differential gear. A further locking lever, which can be displaced by the slide 145 and which locks the tape threading device against displacement when the slide 145 is in the neutral position, can also be provided. Such lever would be displaced by the slide 145 only after the displacement of the cassette holder device to its operational position, whereupon the tape threading device is free to move. Furthermore, a locking mechanism controlled by the tape threading device or by the slide 145 can be provided for the U-shaped slide or one of the two tape run operating devices, in which case the locking mechanism only frees the tape run operating devices for displacement when the tape threading device occupies its threaded position.

Figure 9:
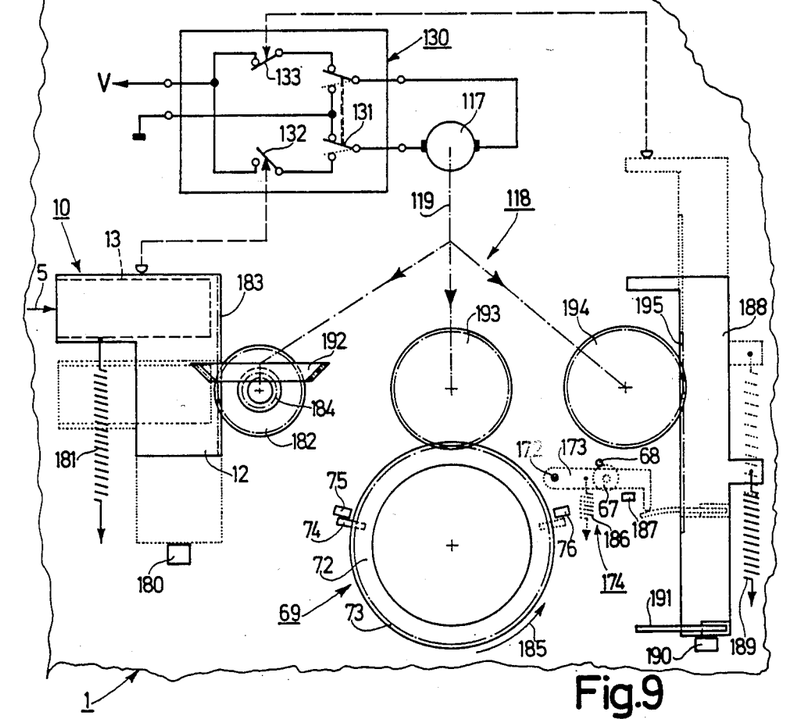
FIG. 9 is a highly schematic partial plan view of a third embodiment, showing a differential gear having three outputs.

A third embodiment of the recording and playback unit 1 shown highly schematically in FIG. 9 has a cassette holder 10, which can be moved perpendicular to its top wall 13 between its loading position, shown by continuous lines, and its operational position, shown by dotted lines, in which operational position the side wall 12 of the cassette holder 10 rests against a unit-mounted stop 180. For displacing the cassette holder 10 from its loading position to its operational position an extension spring 181 acts it; for displacing the cassette holder 10 in the opposite direction the cassette holder device is driven by a displacement toothed gear 182, which meshes with a tooth system 183 provided on the side wall 12 of the cassette holder device 10. The displacement toothed gear 182 is integral with bevel gear 184.

Of the tape threading device 69 of the present unit only the ring 72 and its stop 74 are shown. In the unthreaded position of the tape threading device 69, shown by continuous lines, the stop 74 is pressed against the unit-mounted buffer 75 and in the threaded position, shown by dotted lines, it is pressed against the unit-mounted buffer 76. In the present case the tape threading device 69 can be displaced from its unthreaded position to its threaded position in the direction of the arrow 185.

Of the tape run operating devices of the unit shown in FIG. 9 only the pinch roller device 174 is shown. It consists essentially of the pinch roller 67 which can be pressed against the tape drive shaft 68 and which is pivoted on the pinch roller lever 173, which is slewable about the swivelling axis 172. A spring 186 acts upon the pinch roller lever 173 and holds the pinch roller lever pressed against a stop 187 in a neutral position of the pinch roller device 174. For the purpose of displacing the pinch roller device 174 from the neutral position to the operational position shown by dotted lines, a displacement slide 188 is arranged to move in its longitudinal direction. A spring 189 acts on the displacement slide 188 to pull it against a stop 190. The displacement slide 188 is movable between a neutral position shown by continuous lines and an operational position shown by dotted lines. Attached to the displacement slide 188 and projecting transversely from it is a leaf spring 191, whose free end holds the pinch roller device 174 in its operational position when the displacement slide 188 in its operational position.

The unit shown in FIG. 9 has a differential gear 118, which is driven by the motor 117 via its motor shaft 119 and a worm 120 and which has three outputs which are formed by a first output toothed gear 192 constructed as a bevel gear, a second output toothed gear 193 and a third output toothed gear 194. The first output toothed gear 192 meshes constantly with the bevel gear 184, the second output toothed gear 193 with the tooth system 73 of the ring 72 and the third output toothed fear 194 with a tooth system 195 on the displacement slide 188. The control circuit 130 for the motor 117 has the same construction as in the units shown in FIGS. 1 to 7 and 8. The switch 132 of the control circuit 130 is held in its open position by the cassette holder 10 when in its loaded position. The switch 133 of the control circuit 130 is held in its open position by the displacement slide 188 when in its operational position.

Figure 10:
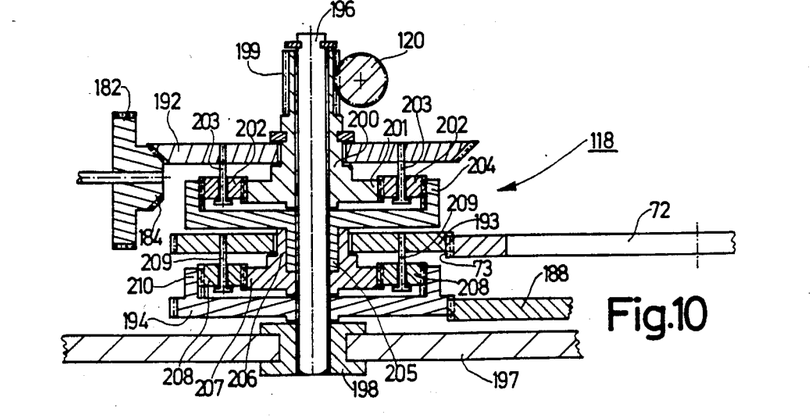
FIG. 10 is a section view of the differential gear of the third embodiment.

The differential gear 118 of the unit shown in FIG. 9 is drawn in detail in FIG. 10. A shaft 196 is inserted into a bush mounted on a chassis panel 197 and fastened in it by, for example, gluing. Journaled on the shaft 196 is a worm pinion 199, which can be driven by the worm 120, which is driven by the motor 117 via the motor shaft 119. The worm pinion 199 is connected in one piece, via a first stepped sleeve 200, to a toothed gear 201, which forms a first sun wheel of the differential gear. Meshing with the first sun wheel 201 are two planet wheels 202, each of which is journaled on a respective shaft 203 pressed into the bevel gear 192. The bevel gear 192, which is journaled on the first stepped sleeve 200, thus forms a first planet carrier and, as mentioned earlier, at the same time forms the first output toothed gear of the differential gear. The two planet wheels 202, for their part, also mesh with a first internal toothed gear 204, which is provided with a sleeve 205 pressed into a second stepped sleeve 206 of a further toothed gear 207, which forms a second sun wheel. Meshing with the second sun wheel 207 are two further planet wheels 208, each of which is pivoted on a shaft 209 pressed into the toothed gear 193. The toothed gear 193, which is journaled on the second stepped sleeve 206, thus forms a second planet carrier and at the same time forms the second output toothed gear. The two further planet wheels 208, for their part, also mesh with a second internal toothed gear 210, which is connected in one piece to the toothed gear 194, which forms the third output toothed gear.

A tape is played by operating a button for starting the "playback" function, whereby the changeover switch 131 is switched to the position shown in FIG. 9 by continuous lines. As a result the circuit for the motor 117 is completed and the worm pinion 119 is driven anticlockwise via the worm 120. One of the three output toothed gears 192, 193 and 194 can be driven by the worm pinion 119 via the differential gear 118, and for this purpose the first output toothed gear 192 and the third output toothed gear 194 can be driven anticlockwise and the second output toothed gear 193 can be driven clockwise. The extension spring 181 supports the driving force exerted upon the first output toothed gear 192, whereas no such supportive load acts upon the second output toothed gear 193 and the spring 189 loads the third output toothed gear 194 and opposes the driving force on the third output toothed gear 194. As a result, the first output toothed gear 192 is initially driven anticlockwise by the worm pinion 199 via the first stepped sleeve 200, the first sun wheel 201, the two planet wheels 202 and their shafts 203, while the further wheels of the differential gear are stationary. The tooth system 183 of the cassette holder 10 is driven by the first output toothed gear 192 via the bevel gear 184 and the displacement toothed gear 182 connected to it. This frees the cassette holder to move by the effect of the spring 181, so that the cassette holder is displaced from its load position. This causes the switch 132 to close. The force of the spring 181 causes the cassette holder to move toward its operational position, whereupon the differential gear ensures a uniform displacement of the cassette holder device. When the cassette holder 10 reaches its operational position it comes up against the stop 180, whereupon the cassette holder and the first output toothed gear 192 are blocked. At this point the load exerted upon the third output toothed gear 194 by the spring 189 is more than the load exerted upon the second output toothed gear 193 by the ring 72. As a result, the second output toothed gear 193 is driven in a clockwise direction via the differential gear. This drive is effected by the worm pinion 199 via the first stepped sleeve 200, the first sun wheel 201, the planet wheels 202, the first internal gear 204, its sleeve 205, the second stepped sleeve 206, the second sun wheel 207, the two further planet wheels 208 and their shafts 209, with the other wheels of the differential gear being stationary. The ring 72 of the tape threading device 69 is driven in the direction of the arrow 185 until the stop 74 on the ring 72 comes up against the unit-mounted buffer 76, so that the ring 72 and the second output toothed gear 913 are blocked. The differential gear 118 now switches the drive over the third output toothed gear 194, whose drive is effected in an anticlockwise direction by the worm pinion 199 via the first stepped sleeve 200, the first sun wheel 201, the two planet wheels 202, the first internal gear 204, its sleeve 205, the second stepped sleeve 206, the second sun wheel 207, the further planet wheels 208 and the second internal toothed gear 210, while the other wheels of the differential gear are stationary. As a result of this the displacement slide 188 is displaced from its neutral position against the force of the spring 189 and the pinch roller device 174 is displaced to its operational position, in which the leaf spring 181 holds it against the tape drive shaft 68. During displacement of slide 188 other tape run operating devices can also be displaced, such as a winding disc drive device, a winding disc brake device and a tape tension adjustment device. When the displacement slide 188 reaches its operational position, the switch 133 opens, so that the motor 117 stops running. When this happens the first sun wheel 201 is blocked against torsion owing to the self-locking between the worm 120 and the worm pinion 199 via the first stepped sleeve 200. The pinch roller device 174 is then held in its operational position, against the force of the springs 186, 191 and 189 by the stop 180 via the displacement slide 188, the third output toothed gear 194, the second internal gear 210, the two further planet wheels 208, the second sun wheel 207, the second stepped sleeve 205, the first internal gear 204, the two planet wheels 202, their shafts 203, the first output toothed gear 192, the bevel gear 184, the displacement toothed gear 182, the tooth system 183 and the cassette holder 10. When this happens the tape threading device 69 is held against the buffer 76 by the force of the spring 189 via the displacement slide 188, the third output toothed gear 194, the second hollow gear 210, the two further planet wheels 208, their shafts 209, the second output toothed gear 193, the ring 72 and its stop 74 and in this way is positioned securely in its thread position. When this happens the cassette holder 10 is held by the extension spring 181 in its operational position, in which it is pressed against the stop 180. When the sequence of functions described above is completed a playback process can be effected.

To remove a cassette from the unit, the changeover switch 131 is switched to the position shown in FIG. 9 by dotted lines, in which the circuit for the motor 117 is completed via the previously closed switch 132. The motor 117 then drives the worm pinion 199 in a clockwise direction via the worm 120, whereupon either the first output toothed gear 192 is driven clockwise or the second output toothed gear 193 is driven anticlockwise or the third output toothed gear 194 is driven clockwise, depending on the loads exerted on the outputs of the differential gear. At this point the spring acting upon the displacement slide 188 forms a load which supports the driving force exerted upon the third output toothed gear 194, and the tape threading device 69 exerts no such supportive load upon the second output toothed gear 193 and the extension spring 181 acting upon the cassette holder 10 forms a load acting upon the first output toothed gear 192 which opposes the driving force exerted upon the first output toothed gear 192. As a result, the third output toothed gear 194 is driven in a clockwise direction by the worm pinion 199 via the force flow chain previously described, and the displacement slide 188 is displayed from its operational position by the effect of the spring 189. When this happens the coupling of the differential gear to the displacement slide 188 ensures a uniform displacement thereof, during which the pinch roller device 174 is moved back to its original neutral position. When the displacement slide 188 reaches its neutral position it comes up against the stop 190, so that the displacement slide and the third output toothed gear 194 are blocked. At this point the cassette holder 10, held in its operational position by means of the extension spring 188, represents a greater load on the first output toothed gear 192 than the tape threading device 69 represents on the second toothed gear 193 of the differential gear. As a result, the second output toothed gear 193 is driven anticlockwise by the worm pinion 199 and the tape threading device 69 is displaced from its threaded position in the opposite direction to the arrow 185. When the tape threading device 69 reaches its unthreaded position the stop 74 abuts the buffer 75, as a result of which the second output toothed gear 193 is blocked. As a result the first output toothed gear 192 is driven clockwise and the cassette holder 10 is displaced from its operational position against the force of the extension spring 181. When the cassette holder reaches its loading position the switch 132 opens, stopping the motor 117. When the motor 117 is stationary the self-locking between the worm 120 and the worm pinion 199 again blocks the first sun wheel 201 against torsion. When this happens the cassette holder is held in its loading position against the force of the extension spring 181 by the stop 190 via the displacement toothed gear 182, the bevel gear 184, the first output toothed gear 192, the shafts 203, the two planet wheels 202, the first internal toothed gear 204, the sleeve 205, the second stepped sleeve 206, the second sun wheel 207, the two further planet wheels 208, the second internal toothed gear 210, the third output toothed gear 194 and the displacement slide 188. The tape threaded device 69 is now held against the unit-mounted buffer 75 by the force of the extension 181 via the cassette holder device 10, the displacement toothed gear 182, the bevel gear 184, the first output toothed gear 192, the shafts 203, the two planet wheels 202, the first internal toothed gear 204, the sleeve 205, the second stepped sleeve 206, the second sun wheel 207, the two further planet wheels 208, their shafts 209, the second output toothed gear 193, the ring 72 and its stop 74. The pinch roller device 174 is held in its neutral position by the spring 186, which acts upon the pinch roller lever 173, and the displacement slide 188 is held against the stop 190 by the spring 189. The cassette can now be removed from the cassette holder.

The use of a differential gear with three outputs offers the advantage that the spatial position of the unit devices which can be driven by the three outputs can be freely selected practically without limitations.

Other possibilities offer themselves in the context of the invention. In a unit with a differential gear with only two outputs, the cassette holder can be displayed via one output and the tape threading device and at least one tape run operating device can be displayed via the other output. In such a unit the other output can drive two displacement slides, one of which can drive the tape threading device and the other the tape run operating device. In the three embodiments described above a worm drive blocks the input-side drive wheel when the drive motor for the differential gear is stationary. Alternatively, a cable drive could be provided and the input-side drive wheel could be blocked by means of a movable bolt, so that when the unit device last displaced by the differential gear comes into operative connection with the input-side drive wheel, it locks it against torsion. In addition, for each of the unit devices to be displaced via the differential gear a separate locking device can be provided, thus rendering unnecessary a locking system for the input-side drive wheel. The cassette holder device can also be horizontally pivoted about a shaft between a loading position and an operational position and can be movable by means of the differential gear. The tape threading device may have two lever mechanisms movable in opposite directions about the drum-shaped scanning device, each lever mechanism carrying at least one tape guide and being movable by means of the differential gear between its unthreaded position and its threaded position. Possibilities for tape run operating devices include a limit switch which can be brought into operative connection with the magnetic tape and is movable between a neutral position and an operational position by means of the differential gear via one of its outputs. Stoppage of the magnetic tape can be detected using a photoelectric tape run operating method.

What is claimed is:

1. A recording and/or playback unit for magnetic tape housed in a cassette of the type out of which a tape is drawn, said unit comprising
    a cassette holder device movable between a loading position, in which the cassette can be isnerted into the holder, and an operational position, in which the cassette occupies an operational position;
    a tape scanning device;
    a tape threading device for drawing the tape out of a cassette when in the operational position and for wrapping the tape around the scanning device, said threading device being movable between an unthreaded position, in which it engages behind the magnetic tape housed in the cassette, and a threaded position, in which it holds the tape wrapped around the scanning device after the tape has been drawn out of the cassette, at least one tape run operating device movable between at least two operational positions and operative in at least one of its operational positions to carry out at least one tape run function when the cassette is in its operational position, a differential gear which can be driven in opposed directions of rotation by a motor and has at least two outputs, the differential gear via one output displacing the cassette holder between its loading position and its operational position and via at least one further output displacing the tape threding device and the tape run operating device.

2. A unit as claimed in claim 1, in which the differential gear has two outputs and drives via one output the tape threading device and via the other output a displacement component, which, when the tape threading device is in its unthreaded position, is movable via the other output between a neutral position and an intermediate position in which it can be stopped and in which the tape threading device is movable via the one output between its unthreaded position and its threaded position, and which, when the tape threading device is in its threaded position, is movable via the other output between its intermediate position and at least one displacement position, whereupon the displacement component, when it moves between its neutral position and its intermediate position, can move the cassette holder device between its loading position and its operational position and, when it moves between its intermediate position and at least one of its displacement positions, can move the tape run operating device between at least two of its operational positions.

3. A unit as claimed in claim 1 in which differential gear has three outputs and, for the purpose of displacing the cassette holder, device the tape threading device (69) and the tape run operating device, one of these three devices is movable by means of the differential gear via any of the three outputs.

4. A recording and/or playback unit for magnetic tape housed in a cassette of the type out of which a tape is drawn, said unit comprising a cassette holder device movable between a loading position, in which the cassette can be inserted into the holder, and an opertional position, in which the cassette occupies an operational position;

a tape scanning device;

a tape threading device for drawing the tape out of a cassette when in the operational position and for wrapping the tape around the scanning device, said threading device being movable between an unthreaded position, in which it engages behind the magnetic tape housed in the cassette, and a threaded position, in which it holds the tape wrapped around the scanning device after the tape has been drawn out of the cassette, at least one tape run operating device movable between at least two operational positions and operative in at least one of its operational positions to carry out at least one tape run function when the cassette is in its operational position, a differential gear which can be driven in opposed directions of rotation by a motor and has two outputs by means of which the cassette holder device, the tape threading device and the tape run operating device are movable, the differential gear via one output displacing one of these three devices and via the other output displacing a displacement component movable between a neutral position and at least one displacement position, sid displacement component displacing the other two devices sequentially in time.

* * * * *